(12) United States Patent
Peng

(10) Patent No.: US 10,187,935 B2
(45) Date of Patent: *Jan. 22, 2019

(54) LIGHT EMITTING DIODE LAMP WITH BURNABLE FUNCTION AND LIGHT EMITTING DIODE LAMP STRING WITH BURNABLE FUNCTION

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 13 days.

This patent is subject to a terminal disclaimer.

(21) Appl. No.: 15/863,189

(22) Filed: Jan. 5, 2018

(65) Prior Publication Data

US 2018/0132314 A1  May 10, 2018

Related U.S. Application Data

(63) Continuation-in-part of application No. 14/521,118, filed on Oct. 22, 2014, now Pat. No. 9,930,734.

(51) Int. Cl.
  *H05B 33/08* (2006.01)
  *H05B 37/02* (2006.01)
  *H04L 29/12* (2006.01)

(52) U.S. Cl.
  CPC ..... *H05B 33/0809* (2013.01); *H05B 33/0845* (2013.01); *H05B 33/0857* (2013.01); *H05B 37/0245* (2013.01); *H04L 61/20* (2013.01); *H04L 61/2038* (2013.01)

(58) Field of Classification Search
  CPC ............ H05B 33/0842; H05B 33/0845; H05B 33/086; H05B 33/0803; H05B 33/0821; H05B 33/0806; H05B 33/0809; H05B 33/0827; H05B 33/0857; H05B 33/0812; H05B 33/0815
  See application file for complete search history.

(56) References Cited

U.S. PATENT DOCUMENTS

| | | | |
|---|---|---|---|
| 9,930,734 B2 * | 3/2018 | Peng | H05B 33/0803 |
| 2011/0096099 A1 | 4/2011 | Yamamoto et al. | |
| 2013/0147370 A1 | 6/2013 | Williams et al. | |
| 2013/0169178 A1 * | 7/2013 | Peng | H05B 37/02 |
| | | | 315/201 |

* cited by examiner

*Primary Examiner* — Tung X Le
*Assistant Examiner* — Borna Alaeddini
(74) *Attorney, Agent, or Firm* — Muncy, Geissler, Olds & Lowe, P.C.

(57) ABSTRACT

A light emitting diode lamp with a burnable function includes a light emitting diode and a light emitting diode driving apparatus. The light emitting diode driving apparatus receives a burn start signal and a burn address data sent through a first contact. The light emitting diode driving apparatus burns the burn address data as a local address data into the light emitting diode driving apparatus after the light emitting diode driving apparatus receives the burn start signal. A first signal is a plurality of pulse signals, and comprises a lighting data and an address data. The light emitting diode driving apparatus compares the address data with the local address data, and drives the light emitting diode to light, glimmer or flash colorfully or sparklingly, or light fade-in and fade-out, based on the lighting data if the address data is the same with the local address data.

17 Claims, 5 Drawing Sheets

LIGHT EMITTING DIODE LAMP WITH BURNABLE FUNCTION AND LIGHT EMITTING DIODE LAMP STRING WITH BURNABLE FUNCTION

CROSS REFERENCE TO RELATED APPLICATION

This application is a Continuation-in-Part of co-pending application Ser. No. 14/521,118, filed on Oct. 22, 2014. The entire contents of which are hereby incorporated by reference.

BACKGROUND OF THE INVENTION

Field of the Invention

The present invention relates to a light emitting diode lamp and a light emitting diode lamp string, and especially relates to a light emitting diode lamp with a burnable function and a light emitting diode lamp string with the burnable function.

Description of the Related Art

Nowadays, the connection types of the light emitting diode lamps are separated into two types: the serial-type connection and the parallel-type connection. The light emitting diode lamps are widely used for external walls of the building, decoration of trees, signboards and scenery designing.

In the related art serial-type light emitting diode lamps, a plurality of light emitting diode lamps are commonly connected in series. Also, the amount of the light emitting diode lamps is determined according to the volume of the decorated objects. In addition, all of the light emitting diode lamps are controlled by the same controller which initially controls the first light emitting diode lamp.

The parallel-type light emitting diode lamps are connected to the controller in parallel. Accordingly, each one of the light emitting diode lamps is controlled by the controller through a control line and an address line, respectively. For example, ten control lines and ten address lines need to be used when ten light emitting diode lamps are employed to be connected in parallel.

The remaining light emitting diode lamps can still be normally controlled when one of the light emitting diode lamps is abnormal. However, the amount of the control lines and the address lines increase proportionally. Therefore, complexity and the costs of the equipment also increase when the amount of the light emitting diode lamps increases.

No matter the connection type of the light emitting diode lamps is the serial-type or the parallel-type, many power transmission lines and signal transmission lines need to be used to control the colors and intensities of the light emitting diode lamps. Accordingly, cost down can be achieved only if the amount of the power transmission lines or the signal transmission lines can be reduced.

Afterwards, a light emitting diode driving apparatus transmitting lighting signals (comprising the lighting data and the address data) with the power line is provided. The local address data has to be burned into the light emitting diode driving apparatus when the light emitting diode driving apparatus is manufactured. The light emitting diode driving apparatus checks whether the address data is the same with the local address data or not when the light emitting diode driving apparatus receives the lighting signals. The light emitting diode driving apparatus drives the light emitting diode if the address data is the same with the local address data.

However, the disadvantage of the method that the local address data is burned into the light emitting diode driving apparatus before the light emitting diode driving apparatus has been manufactured is that the local address data cannot be changed once the light emitting diode driving apparatus has been manufactured. Therefore, it is very inconvenient for the warehouse management. Moreover, it is also very inconvenient for assembling a lot of light emitting diode driving apparatuses because the operator has to check the local address data of every one of the light emitting diode driving apparatuses to avoid assembling incorrect light emitting diode driving apparatuses.

SUMMARY OF THE INVENTION

In order to solve the above-mentioned problems, an object of the present invention is to provide a light emitting diode lamp with a burnable function.

In order to solve the above-mentioned problems, another object of the present invention is to provide a light emitting diode lamp string with a burnable function.

In order to achieve the object of the present invention mentioned above, the light emitting diode lamp comprises at least a light emitting diode and a light emitting diode driving apparatus with a burnable function. The light emitting diode driving apparatus is electrically connected to the light emitting diode. The light emitting diode driving apparatus comprises a first contact and a second contact. The light emitting diode driving apparatus receives a burn start signal sent through the first contact and a burn address data sent through the first contact. The light emitting diode driving apparatus is configured to burn the burn address data as a local address data into the light emitting diode driving apparatus after the light emitting diode driving apparatus receives the burn start signal. A first signal is a plurality of pulse signals, and comprises a lighting data and an address data. The light emitting diode driving apparatus is configured to compare the address data with the local address data stored in the light emitting diode driving apparatus when the light emitting diode driving apparatus receives the first signal, and then the light emitting diode driving apparatus is configured to drive the light emitting diode to light, glimmer or flash colorfully or sparklingly, or light fade-in and fade-out, based on the lighting data if the address data is the same with the local address data.

In order to achieve the object of the present invention mentioned above, the light emitting diode lamp string comprises a plurality of light emitting diode lamps with burnable functions, a control unit and a power supply unit. The light emitting diode lamps are electrically connected to each other. The control unit is electrically connected to the light emitting diode lamps. The control unit sends a first signal, a burn start signal and a burn address data to the light emitting diode lamps. The power supply unit is electrically connected to the control unit. The light emitting diode lamp comprises at least a light emitting diode and a light emitting diode driving apparatus with the burnable function. The light emitting diode driving apparatus is electrically connected to the light emitting diode. The light emitting diode driving apparatus comprises a first contact and a second contact. The light emitting diode driving apparatus receives the burn start signal sent through the first contact and the burn address data sent through the first contact. The light emitting diode driving apparatus is configured to burn the burn address data as a local address data into the light emitting diode driving apparatus after the light emitting diode driving apparatus receives the burn start signal. A first signal is a plurality of pulse signals, and comprises a lighting data and an address data. The light emitting diode driving apparatus is configured to compare the address data with the local address data stored in the light emitting diode driving apparatus when the light emitting diode driving apparatus receives the first signal, and then the light emitting diode driving apparatus is configured to drive the light emitting diode to light, glimmer or flash colorfully or sparklingly, or light fade-in and fade-out, based on the lighting data if the address data is the same with the local address data.

The advantage of the present invention is to burn the burn address data as a local address data into the light emitting diode driving apparatus which had already been manufactured.

DETAILED DESCRIPTION OF THE INVENTION

Figure 1:
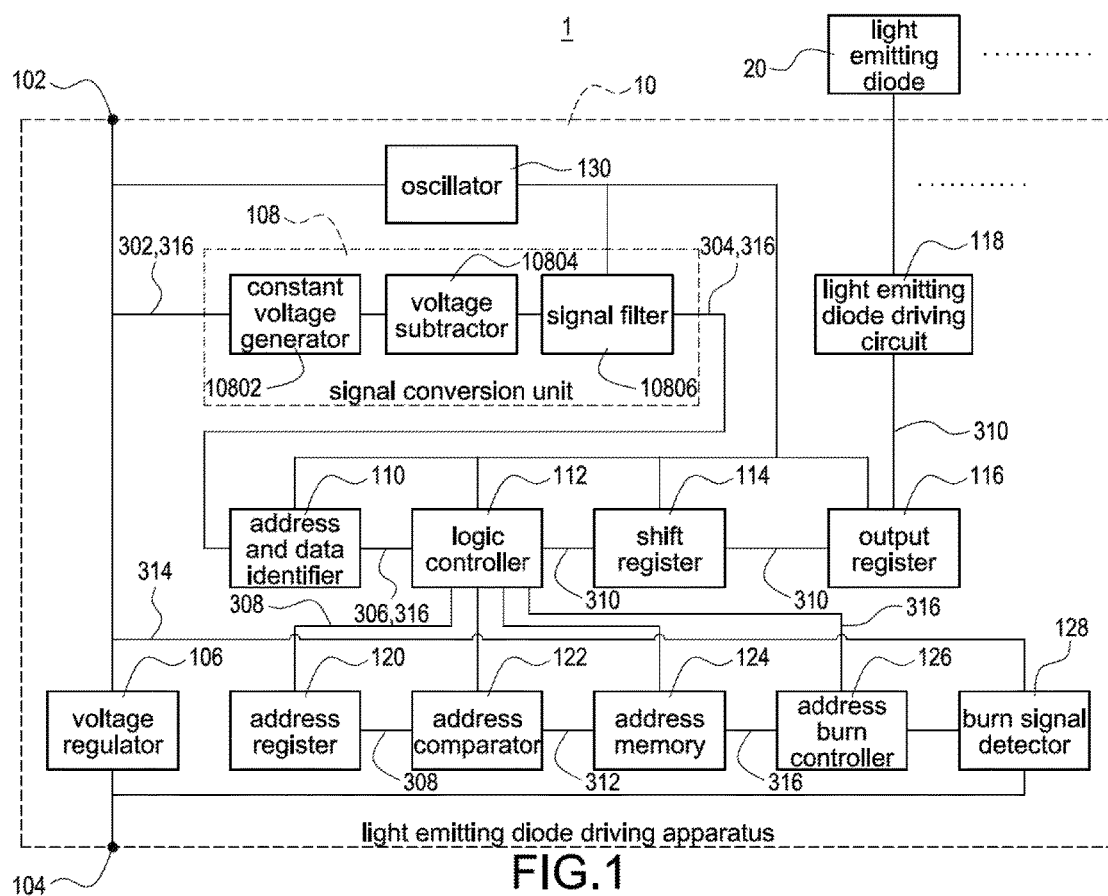
FIG. 1 shows a block diagram of the light emitting diode lamp of the present invention.

FIG. 1 shows a block diagram of the light emitting diode lamp of the present invention. A light emitting diode lamp 1 with a burnable function comprises at least a light emitting diode 20 and a light emitting diode driving apparatus 10 with the burnable function. The light emitting diode driving apparatus 10 is electrically connected to the light emitting diode 20. In the present invention, the wording "burning" means "data writing", the wording "burnable" means "data writable", and the wording "burn start" means "data-writing start", and so on.

The light emitting diode driving apparatus 10 receives a burn start signal 314 sent through a first contact 102 and a burn address data 316 sent through the first contact 102. The light emitting diode driving apparatus 10 is configured to burn the burn address data 316 as a local address data 312 into the light emitting diode driving apparatus 10 after the light emitting diode driving apparatus 10 receives the burn start signal 314.

The light emitting diode driving apparatus 10 comprises the first contact 102, a second contact 104, a voltage regulator 106, a signal conversion unit 108, an address and data identifier 110, a logic controller 112, a shift register 114, an output register 116, a light emitting diode driving circuit 118, an address register 120, an address comparator 122, an address memory 124, an address burn controller 126, a burn signal detector 128 and an oscillator 130. The first contact 102 is, for example but not limited to, a positive contact. The second contact 104 is, for example but not limited to, a negative contact.

The signal conversion unit 108 comprises a constant voltage generator 10802, a voltage subtractor 10804 and a signal filter 10806.

The second contact 104 is arranged opposite to the first contact 102. The voltage regulator 106 is electrically connected to the first contact 102 and the second contact 104. The signal conversion unit 108 is electrically connected to the first contact 102. The address and data identifier 110 is electrically connected to the signal conversion unit 108. The logic controller 112 is electrically connected to the address and data identifier 110. The shift register 114 is electrically connected to the logic controller 112. The output register 116 is electrically connected to the shift register 114. The light emitting diode driving circuit 118 is electrically connected to the output register 116 and the light emitting diode 20.

The address register 120 is electrically connected to the logic controller 112. The address comparator 122 is electrically connected to the logic controller 112 and the address register 120. The address memory 124 is electrically connected to the logic controller 112 and the address comparator 122. The address burn controller 126 is electrically connected to the logic controller 112 and the address memory 124. The burn signal detector 128 is electrically connected to the first contact 102, the second contact 104 and the address burn controller 126. The oscillator 130 is electrically connected to the first contact 102, the signal filter 10806, the address and data identifier 110, the logic controller 112, the shift register 114 and the output register 116.

The constant voltage generator 10802 is electrically connected to the first contact 102. The voltage subtractor 10804 is electrically connected to the constant voltage generator 10802. The signal filter 10806 is electrically connected to the voltage subtractor 10804 and the address and data identifier 110.

A first signal 302 is a plurality of pulse signals, and comprises a lighting data 310 and an address data 308. The light emitting diode driving apparatus 10 is configured to compare the address data 308 with the local address data 312 stored in the light emitting diode driving apparatus 10 when the light emitting diode driving apparatus 10 receives the first signal 302, and then the light emitting diode driving apparatus 10 is configured to drive the light emitting diode 20 to light, glimmer or flash colorfully or sparklingly, or light fade-in and fade-out, based on the lighting data 310 if the address data 308 is the same with the local address data 312. The light emitting diode driving apparatus 10 is configured to open-loop drive the light emitting diode 20 to light, glimmer or flash colorfully or sparklingly, or light fade-in and fade-out, based on the lighting data 310 if the address data 308 is the same with the local address data 312.

In details, the first signal 302 is sent to the signal conversion unit 108 through the first contact 102. The signal conversion unit 108 converts the first signal 302 into a second signal 304 for being identified by the address and data identifier 110. The signal conversion unit 108 sends the second signal 304 to the address and data identifier 110. The address and data identifier 110 identifies the second signal 304 to obtain a third signal 306. The third signal 306 comprises the address data 308 and the lighting data 310. The address and data identifier 110 sends the third signal 306 to the logic controller 112. The logic controller 112 sends the address data 308 to the address register 120. The address comparator 122 is configured to compare the address data 308 with the local address data 312 which is stored in the address memory 124.

If the address data 308 is the same with the local address data 312, the address comparator 122 informs the logic controller 112 of the address data 308 being the same with the local address data 312, and then the logic controller 112 sends the lighting data 310 to the light emitting diode driving circuit 118 through the shift register 114 and the output register 116. The light emitting diode driving circuit 118 drives the light emitting diode 20 to light, glimmer or flash colorfully or sparklingly, or light fade-in and fade-out, according to the lighting data 310.

The burn signal detector 128 detects the burn start signal 314 and then informs the address burn controller 126 of the burn start signal 314. The address burn controller 126 burns the burn address data 316 into the address memory 124 as the local address data 312.

In another word, the burn signal detector 128 informs the address burn controller 126 of the burn start signal 314 if the burn signal detector 128 detects the burn start signal 314 sent through the first contact 102. And then, the address burn controller 126 starts to receive the burn address data 316 sent through the first contact 102, the signal conversion unit 108, the address and data identifier 110 and the logic controller 112. The address burn controller 126 burns the burn address data 316 into the address memory 124, so that the address memory 124 stores the local address data 312.

The address memory 124 is, for example but not limited to, a repeatable burned memory, an EEPROM or a Flash memory. The address memory 124 has to be scraped when the burn address data 316 is burned incorrectly if the address memory 124 is not a repeatable burned memory. However, the address memory 124 is a repeatable burned memory, so the address memory 124 is repeatable burned when the burn address data 316 is burned incorrectly. Then, the address memory 124 does not have to be scraped, so that the cost is saved.

The burn start signal 314 is, for example, a voltage greater than a working voltage of the light emitting diode driving apparatus 10. The burn start signal 314 is, for example, 7 volts if the working voltage of the light emitting diode driving apparatus 10 is 3.5 volts. The light emitting diode 20 is a dip light emitting diode or a SMD light emitting diode.

Figure 4:
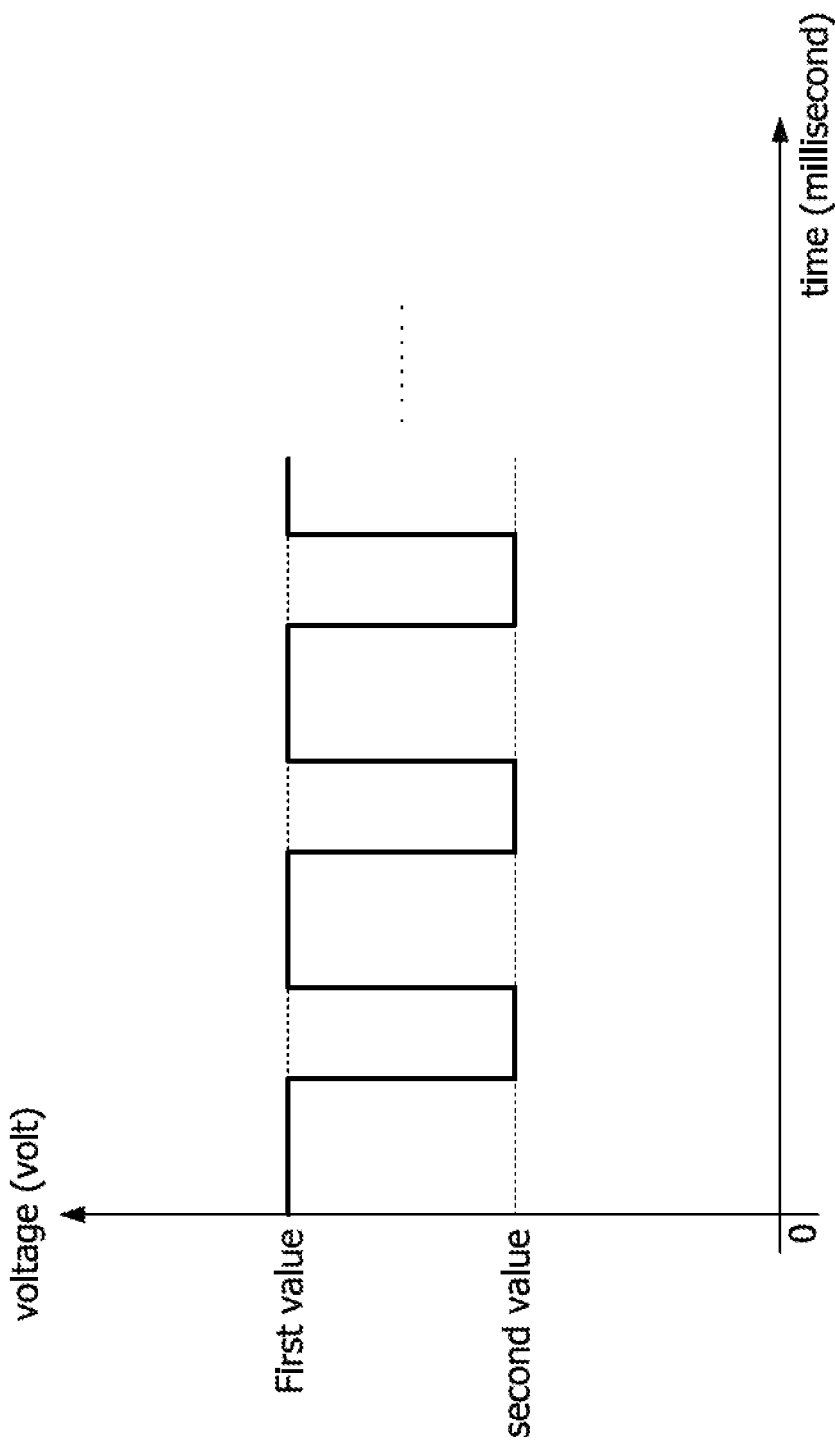
FIG. 4 shows a waveform diagram of an embodiment of the first signal of the present invention.
Figure 5:
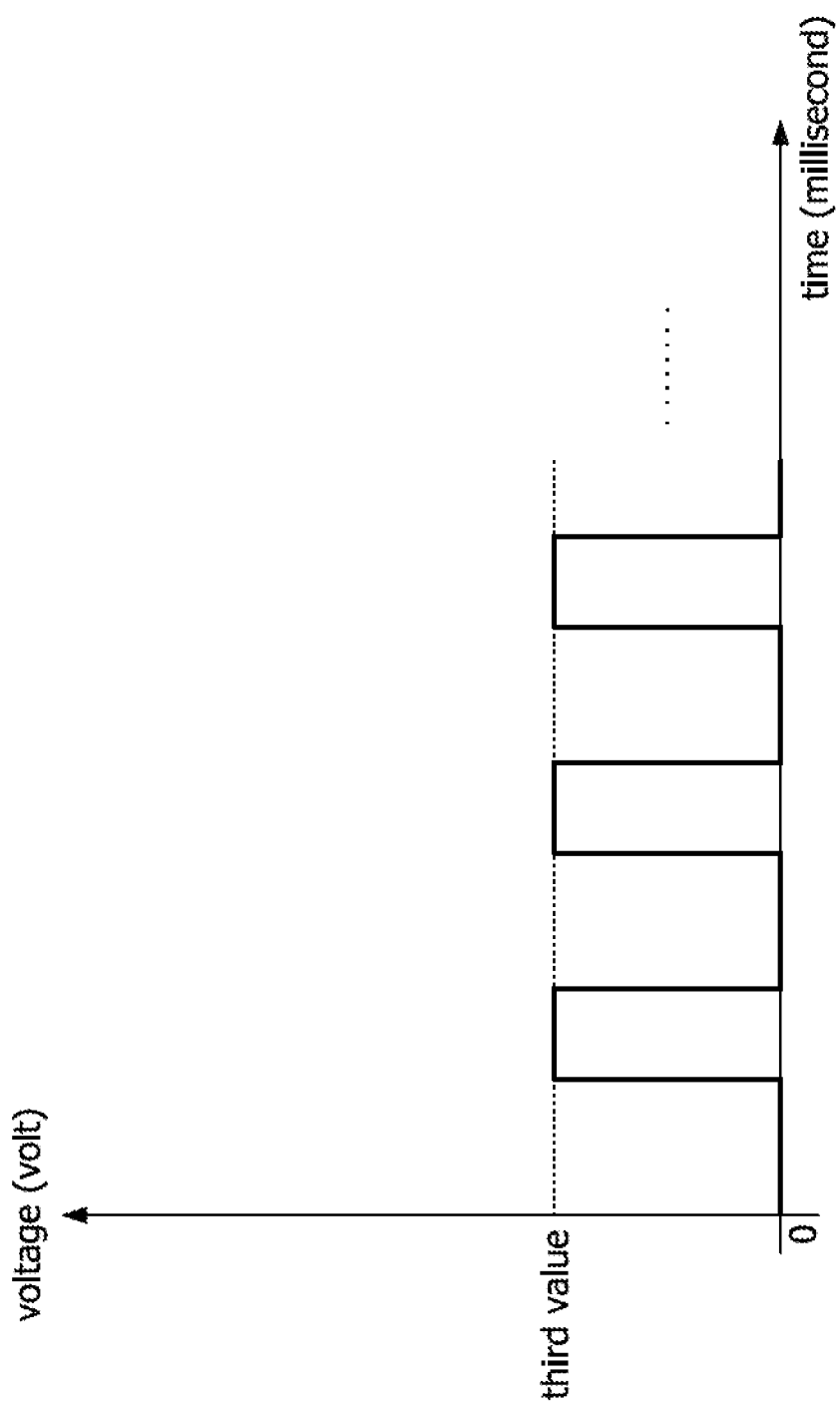
FIG. 5 shows a waveform diagram of an embodiment of the burn start signal (or the burn address data) of the present invention.

FIG. 4 shows a waveform diagram of an embodiment of the first signal of the present invention. The first signal 302 is between a first value and a second value. The first value is greater than the second value. The second value is greater than zero. FIG. 5 shows a waveform diagram of an embodiment of the burn start signal (or the burn address data) of the present invention. The burn start signal 314 (or the burn address data 316) is between a third value and zero. The third value is greater than zero. From FIG. 4 and FIG. 5, it is aware that the first signal 302 is inverting with the burn start signal 314 and the burn address data 316, so that it is easy for the light emitting diode driving apparatus 10 to tell the first signal 302 from the burn start signal 314 (or the burn address data 316).

Figure 6:
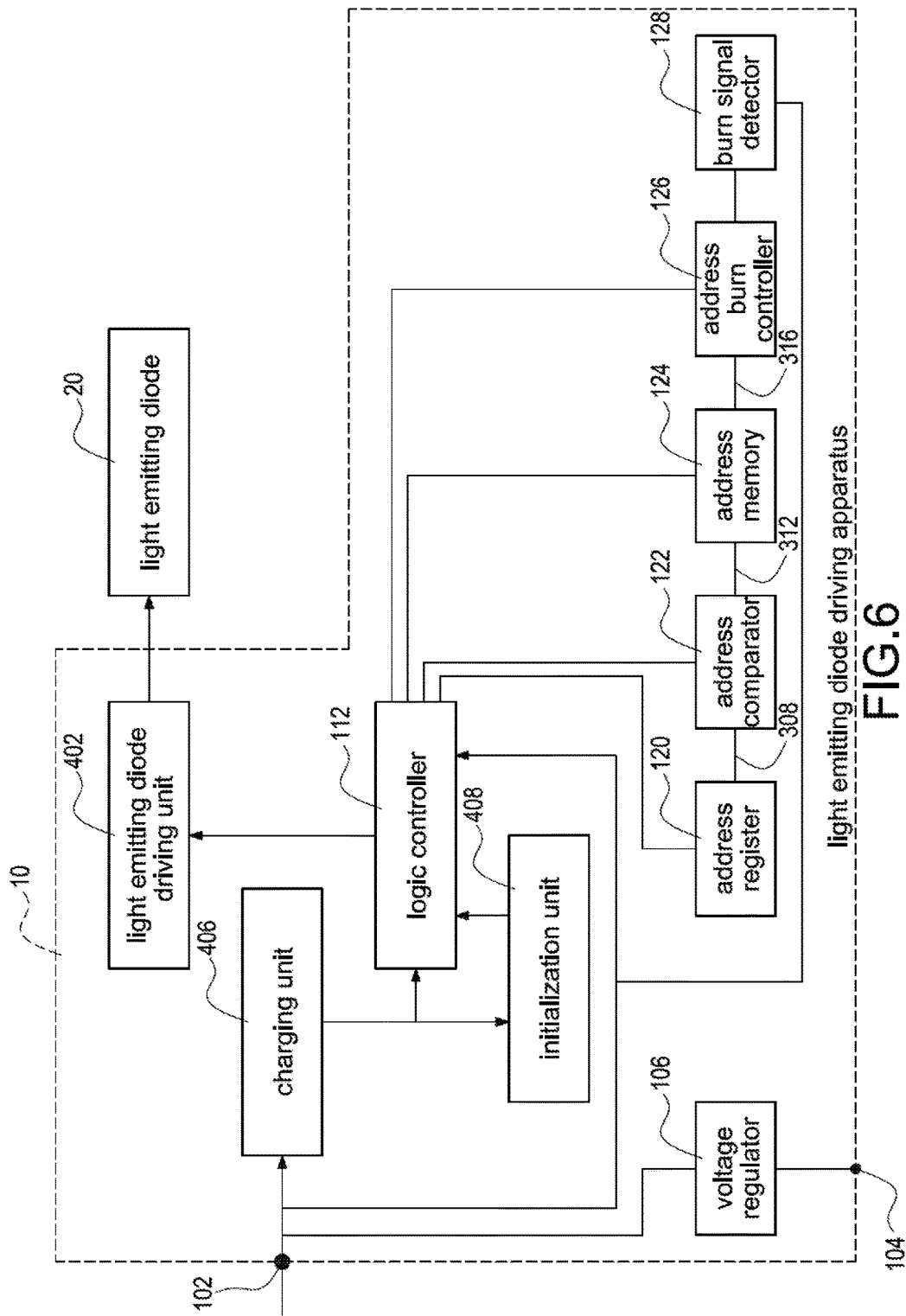
FIG. 6 shows a partial block diagram of another embodiment of the light emitting diode lamp of the present invention.

FIG. 6 shows a partial block diagram of another embodiment of the light emitting diode lamp of the present invention. The descriptions of the elements and contents shown in FIG. 6 which are the same as the elements shown in FIG. 1 are not repeated here for brevity. The light emitting diode driving apparatus 10 further comprises a light emitting diode driving unit 402, a logic controller 112, a charging unit 406, an initialization unit 408, an address register 120, an address comparator 122, an address memory 124, an address burn controller 126 and a burn signal detector 128.

The light emitting diode driving unit 402 is electrically connected to the light emitting diode 20. The logic controller 112 is electrically connected to the light emitting diode driving unit 402 and is configured to calculate whether the lighting data 310 is a high pulse signal or not. The charging unit 406 is electrically connected to the logic controller 112. The initialization unit 408 is electrically connected to the logic controller 112 and the charging unit 406.

If the address data 308 is the same with the local address data 312 and if the lighting data 310 is the high pulse signal, the charging unit 406 is configured to supply power to the light emitting diode driving unit 402 through the logic controller 112, so that the light emitting diode driving unit 402 is configured to drive the light emitting diode 20 to light.

Figure 2:
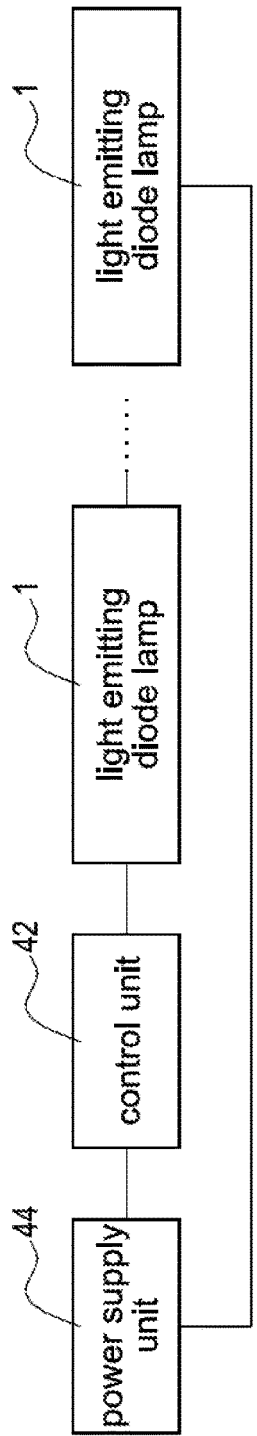
FIG. 2 shows a block diagram of the first embodiment of the light emitting diode lamp string of the present invention.
Figure 3:
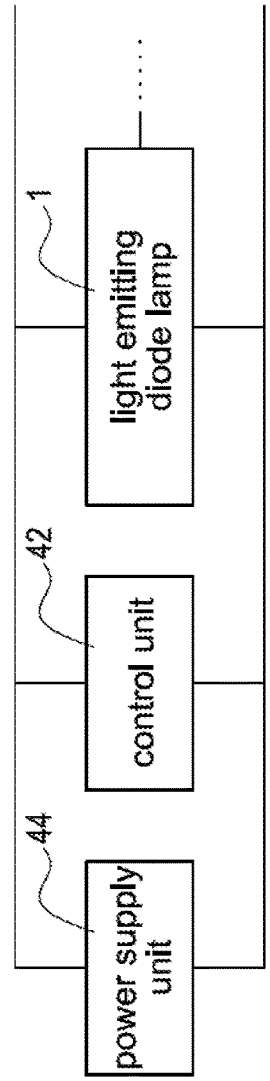
FIG. 3 shows a block diagram of the second embodiment of the light emitting diode lamp string of the present invention.

FIG. 2 shows a block diagram of the first embodiment of the light emitting diode lamp string of the present invention. FIG. 3 shows a block diagram of the second embodiment of the light emitting diode lamp string of the present invention. The description for the elements shown in FIGS. 2 and 3, which are similar to those shown in FIG. 1, is not repeated here for brevity. A light emitting diode lamp string 30 with the burnable function comprises a plurality of light emitting diode lamps 1 mentioned above. The light emitting diode lamps 1 are electrically connected to each other.

The light emitting diode lamp string 30 further comprises a control unit 42 and a power supply unit 44. The control unit 42 is electrically connected to the light emitting diode lamps 1. The control unit 42 sends the first signal 302, the burn start signal 314 and the burn address data 316 to the light emitting diode lamps 1. The power supply unit 44 is electrically connected to the control unit 42. The light emitting diode lamps 1 are electrically connected to each other in series (as shown in FIG. 2) or in parallel (as shown in FIG. 3).

The advantage of the present invention is to burn the burn address data 316 as the local address data 312 into the light emitting diode driving apparatus 10 which had already been manufactured.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting diode lamp with a burnable function, the light emitting diode lamp comprising:
at least a light emitting diode; and
a light emitting diode driving apparatus with the burnable function, the light emitting diode driving apparatus electrically connected to the light emitting diode,
wherein the light emitting diode driving apparatus comprises:
a first contact; and
a second contact,
wherein the light emitting diode driving apparatus receives a burn start signal sent through the first contact and a burn address data sent through the first contact;
the light emitting diode driving apparatus is configured to burn the burn address data as a local address data into the light emitting diode driving apparatus after the light emitting diode driving apparatus receives the burn start signal;

wherein a first signal is a plurality of pulse signals, and comprises a lighting data and an address data; the light emitting diode driving apparatus is configured to compare the address data with the local address data stored in the light emitting diode driving apparatus when the light emitting diode driving apparatus receives the first signal, and then the light emitting diode driving apparatus is configured to drive the light emitting diode to light, glimmer or flash colorfully or sparklingly, or light fade-in and fade-out, based on the lighting data if the address data is the same with the local address data.

2. The light emitting diode lamp in claim 1, wherein the burn start signal is a voltage greater than a working voltage of the light emitting diode driving apparatus; the first contact is a positive contact; the second contact is a negative contact.

3. The light emitting diode lamp in claim 1, wherein the light emitting diode driving apparatus further comprises:
  a voltage regulator electrically connected to the first contact and the second contact;
  a signal conversion unit electrically connected to the first contact;
  an address and data identifier electrically connected to the signal conversion unit;
  a logic controller electrically connected to the address and data identifier;
  a shift register electrically connected to the logic controller;
  an output register electrically connected to the shift register;
  a light emitting diode driving circuit electrically connected to the output register and the light emitting diode;
  an address register electrically connected to the logic controller;
  an address comparator electrically connected to the logic controller and the address register;
  an address memory electrically connected to the logic controller and the address comparator;
  an address burn controller electrically connected to the logic controller and the address memory; and
  a burn signal detector electrically connected to the first contact, the second contact and the address burn controller,
  wherein the first signal is sent to the signal conversion unit through the first contact; the signal conversion unit converts the first signal into a second signal for being identified by the address and data identifier; the signal conversion unit sends the second signal to the address and data identifier; the address and data identifier identifies the second signal to obtain a third signal; the third signal comprises the address data and the lighting data; the address and data identifier sends the third signal to the logic controller; the logic controller sends the address data to the address register; the address comparator is configured to compare the address data with the local address data stored in the address memory;
  wherein if the address data is the same with the local address data, the address comparator informs the logic controller of the address data being the same with the local address data, and then the logic controller sends the lighting data to the light emitting diode driving circuit through the shift register and the output register; the light emitting diode driving circuit drives the light emitting diode to light, glimmer or flash colorfully or sparklingly, or light fade-in and fade-out, according to the lighting data;
  wherein the burn signal detector detects the burn start signal and then informs the address burn controller of the burn start signal; the address burn controller burns the burn address data into the address memory as the local address data.

4. The light emitting diode lamp in claim 3, wherein the signal conversion unit comprises:
  a constant voltage generator electrically connected to the first contact;
  a voltage subtractor electrically connected to the constant voltage generator; and
  a signal filter electrically connected to the voltage subtractor and the address and data identifier.

5. The light emitting diode lamp in claim 4, wherein the light emitting diode driving apparatus further comprises an oscillator electrically connected to the first contact, the signal filter, the address and data identifier, the logic controller, the shift register and the output register;
  the address memory is a repeatable burned memory.

6. The light emitting diode lamp in claim 1, wherein the light emitting diode driving apparatus further comprises:
  a light emitting diode driving unit electrically connected to the light emitting diode;
  a logic controller electrically connected to the light emitting diode driving unit and calculating whether the lighting data is a high pulse signal or not;
  a charging unit electrically connected to the logic controller; and
  an initialization unit electrically connected to the logic controller and the charging unit,
  wherein if the address data is the same with the local address data and if the lighting data is the high pulse signal, the charging unit is configured to supply power to the light emitting diode driving unit through the logic controller, so that the light emitting diode driving unit is configured to drive the light emitting diode to light.

7. The light emitting diode lamp in claim 1, wherein the first signal is inverting with the burn start signal and the burn address data.

8. The light emitting diode lamp in claim 1, wherein the light emitting diode driving apparatus is configured to open-loop drive the light emitting diode to light, glimmer or flash colorfully or sparklingly, or light fade-in and fade-out, based on the lighting data if the address data is the same with the local address data.

9. A light emitting diode lamp string with a burnable function, the light emitting diode lamp string comprising:
  a plurality of light emitting diode lamps with the burnable function, the light emitting diode lamps electrically connected to each other;
  a control unit electrically connected to the light emitting diode lamps, the control unit sending a first signal, a burn start signal and a burn address data to the light emitting diode lamps; and
  a power supply unit electrically connected to the control unit,
  wherein the light emitting diode lamp comprises:
  at least a light emitting diode; and
  a light emitting diode driving apparatus with the burnable function, the light emitting diode driving apparatus electrically connected to the light emitting diode,
  wherein the light emitting diode driving apparatus comprises:
  a first contact; and a second contact,
wherein the light emitting diode driving apparatus receives the burn start signal sent through the first contact and the burn address data sent through the first contact; the light emitting diode driving apparatus is configured to burn the burn address data as a local address data into the light emitting diode driving apparatus after the light emitting diode driving apparatus receives the burn start signal;
wherein the first signal is a plurality of pulse signals, and comprises a lighting data and an address data; the light emitting diode driving apparatus is configured to compare the address data with the local address data stored in the light emitting diode driving apparatus when the light emitting diode driving apparatus receives the first signal, and then the light emitting diode driving apparatus is configured to drive the light emitting diode to light, glimmer or flash colorfully or sparklingly, or light fade-in and fade-out, based on the lighting data if the address data is the same with the local address data.

10. The light emitting diode lamp string in claim 9, wherein the burn start signal is a voltage greater than a working voltage of the light emitting diode driving apparatus; the first contact is a positive contact; the second contact is a negative contact.

11. The light emitting diode lamp string in claim 9, wherein the light emitting diode driving apparatus further comprises:
    a voltage regulator electrically connected to the first contact and the second contact;
    a signal conversion unit electrically connected to the first contact;
    an address and data identifier electrically connected to the signal conversion unit;
    a logic controller electrically connected to the address and data identifier;
    a shift register electrically connected to the logic controller;
    an output register electrically connected to the shift register;
    a light emitting diode driving circuit electrically connected to the output register and the light emitting diode;
    an address register electrically connected to the logic controller;
    an address comparator electrically connected to the logic controller and the address register;
    an address memory electrically connected to the logic controller and the address comparator;
    an address burn controller electrically connected to the logic controller and the address memory; and
    a burn signal detector electrically connected to the first contact, the second contact and the address burn controller,
    wherein the first signal is sent to the signal conversion unit through the first contact; the signal conversion unit converts the first signal into a second signal for being identified by the address and data identifier; the signal conversion unit sends the second signal to the address and data identifier; the address and data identifier identifies the second signal to obtain a third signal; the third signal comprises the address data and the lighting data; the address and data identifier sends the third signal to the logic controller; the logic controller sends the address data to the address register; the address comparator is configured to compare the address data with the local address data stored in the address memory;
    wherein if the address data is the same with the local address data, the address comparator informs the logic controller of the address data being the same with the local address data, and then the logic controller sends the lighting data to the light emitting diode driving circuit through the shift register and the output register; the light emitting diode driving circuit drives the light emitting diode to light, glimmer or flash colorfully or sparklingly, or light fade-in and fade-out, according to the lighting data;
    wherein the burn signal detector detects the burn start signal and then informs the address burn controller of the burn start signal; the address burn controller burns the burn address data into the address memory as the local address data.

12. The light emitting diode lamp string in claim 11, wherein the signal conversion unit comprises:
    a constant voltage generator electrically connected to the first contact;
    a voltage subtractor electrically connected to the constant voltage generator; and
    a signal filter electrically connected to the voltage subtractor and the address and data identifier.

13. The light emitting diode lamp string in claim 12, wherein the light emitting diode driving apparatus further comprises an oscillator electrically connected to the first contact, the signal filter, the address and data identifier, the logic controller, the shift register and the output register; the address memory is a repeatable burned memory.

14. The light emitting diode lamp string in claim 9, wherein the light emitting diode driving apparatus further comprises:
    a light emitting diode driving unit electrically connected to the light emitting diode;
    a logic controller electrically connected to the light emitting diode driving unit and calculating whether the lighting data is a high pulse signal or not;
    a charging unit electrically connected to the logic controller; and
    an initialization unit electrically connected to the logic controller and the charging unit,
    wherein if the address data is the same with the local address data and if the lighting data is the high pulse signal, the charging unit is configured to supply power to the light emitting diode driving unit through the logic controller, so that the light emitting diode driving unit is configured to drive the light emitting diode to light.

15. The light emitting diode lamp string in claim 9, wherein the first signal is inverting with the burn start signal and the burn address data.

16. The light emitting diode lamp string in claim 9, wherein the light emitting diode driving apparatus is configured to open-loop drive the light emitting diode to light, glimmer or flash colorfully or sparklingly, or light fade-in and fade-out, based on the lighting data if the address data is the same with the local address data.

17. The light emitting diode lamp string in claim 9, wherein the light emitting diode lamps are electrically connected to each other in series or in parallel.

* * * * *